United States Patent [19]

Yanor

[11] Patent Number: 5,842,174
[45] Date of Patent: Nov. 24, 1998

[54] TELEPHONE BILLING ANALYZER

[76] Inventor: David Patrick Yanor, 2808 W. 15th Ave., Vancouver, B.C., Canada, V6K 2Z9

[21] Appl. No.: 419,182

[22] Filed: Apr. 10, 1995

[51] Int. Cl.[6] ..................................................... G06F 17/30
[52] U.S. Cl. ..................................................... 705/1; 707/1
[58] Field of Search ................................ 364/401 R, 402, 364/406, 408; 395/600; 379/112, 114, 119, 120, 126, 189; 705/1, 10, 24; 707/1, 10, 100, 102, 200, 500

[56] References Cited

U.S. PATENT DOCUMENTS

| | | | |
|---|---|---|---|
| 5,063,588 | 11/1991 | Patsiokas et al. | |
| 5,093,787 | 3/1992 | Simmons | 395/233 |
| 5,134,564 | 7/1992 | Dunn | 395/233 |
| 5,388,150 | 2/1995 | Schneyer et al. | |

OTHER PUBLICATIONS

ProPhone—advertisement (enclosed).
PhoneDisc—advertisement (enclosed).
Jacqueline Graves, Building a Fortune on Free Data, Fortune magazine, Jun. 02, 1995, p. 31 (enclosed).
Michael Goodwin, Select Phone: America's Phone Book on CD ROM, PC World magazine, Sep. 1994, p. 117 (enclosed).
Robert Brehl, Let your computer disk do the walking, Vancouver Sun newspaper, Apr. 08, 1994 (enclosed).
Lawrence Surtees, New chapter opens for white pages, The Globe & Mail newspaper, Mar. 13, 1992 (enclosed).
Lawrence Surtees, White pages to be opened, The Globe & Mail newspaper, Jan. 15, 1994. (enclosed).
Ron MacSpadyen, A wake–up call to the CD–ROM industry, Aug. 18, 1994 (enclosed).
The Economist, U.S. firm dials China to put phone list on disc, Jan. 23, 1995 (enclosed).
Research: Directory Sources, pp. 12–23 (enclosed).

*Primary Examiner*—Frantzy Poinuil
*Attorney, Agent, or Firm*—Mark M. Yang

[57] ABSTRACT

An apparatus for analyzing telephone billing data to produce augmented billings and reports on calls to classes of telephone numbers selected by the user, such as to calls not on a list of authorized telephone numbers or calls not fulfilling some other predetermined criterion, includes data reading, selecting, and storing means capable of obtaining telephone directory and billing data in machine manipulatable form, comparing means for finding matches between sets of data as well as tracking failures to match, and data combining and outputting means for producing useful reports. External directory information database searching means are provided for matching billing data not matched with the internally stored directory data. Means are also provided for creating a secondary directory of data extracted from previously matched billing data to increase the efficiency of processing of subsequent billing data sets.

34 Claims, 4 Drawing Sheets

TELEPHONE BILLING ANALYZER

BACKGROUND OF THE INVENTION

This invention relates to a method and apparatus for extracting data from at least two collections of data to produce a new set of records in displayable or readable form. A preferred embodiment comprises a method and apparatus suitable for processing long distance telephone bills or equivalent records to add telephone directory and optionally other information pertaining to the telephone number(s) called (for example, the presence or absence of the telephone number called on a list of authorized telephone numbers for long distance calls). Typically this added information will include at least the name(s) under which the telephone number(s) called are listed in the relevant telephone directory or directories.

This invention provides a means for reducing the widespread problem of the losses to businesses from (1) the use by employees of business telephones for personal long distance calls as well as (2) fraud by third parties. By use of this invention telephone bills can be augmented with information about the telephone numbers called obtained from the directories and employees required to reimburse the business for their personal calls. Alternatively, reports can be produced listing only long distance calls to telephone numbers not on a pre-authorized list and providing directory information for those calls. For example, the pre-authorized list could be composed of the telephone numbers of other offices of the business, customers of the business, and suppliers of the business.

The invention may also be used by professional persons such as lawyers to allocate long distance billings to the accounts of clients.

SUMMARY OF THE INVENTION

In its most general embodiment, the apparatus of the present invention reads data from at least two sources of input data containing information organized in a known manner or in a manner ascertainable from the data itself. If necessary, the data are converted to a machine manipulatable form (e.g. from a scanned image to character codes). Data of interest are selected and stored into mass storage having a predetermined structure organized into records having fields for preselected data types. The records from each input data source are stored in separate sets of records in mass storage. The stored records are then processed to produce a resulting output set of data records. Processing may comprise combining selected data from records in the input data sets that match according to a preselected criterion and flagging records in one data set that do or do not have matches in one or more of the other input data sets.

The present invention in one aspect comprises a method and means for capturing selected data within a selected field, e.g. billing information, in whatever form it is provided, and a method and means for processing the selected data together with one or more correlatable selected fields of data in at least one other source of data, e.g. telephone directory information data, to produce a useful output in display or report format. The output data can be stored for later processing. For example, according to the invention, a method and means are provided to produce a report in whatever report form is required showing the names of parties called for long distance calls made from a particular telephone. The selection of report format will depend upon the convenience of the user of the apparatus and method of the invention. Further, one directory can be a listing of authorized long distance numbers. For example, the listing could include the long distance telephone numbers of other offices of the user's organization, the organization's customers, and the organization's suppliers. The invention then comprises a method and means for producing a report listing long distance calls not made to one of the authorized telephone numbers.

An advantage of telephone billing information augmented in the manner contemplated by this invention is the opportunity for reduction in costs to organizations of personal long distance telephone calls made from the organization's telephone system. Reports produced for use by the organization's management showing the names of called parties in addition to the information provided by normal billing reports received from long distance telephone service providers could be used to collect from the responsible employees the costs of personal long distance telephone calls, to discourage personal long distance calls, and to increase employee focus on work-related matters.

Another advantage of the reports contemplated by the present invention would be the identification and allocation of long distance telephone calls associated with a professional's clientele, or related to a project. Reports produced could aid in sorting out the telecommunication charges according to client or by project, with or without assistance from a PBX (Public Branch Exchange) system. A professional could receive the information in a report format on hard copy or in another medium. Files received via modem, backup tape, diskette, CD ROM or similar media would also allow the professional to further sort and organize the telephone charges by whatever criteria is most suitable.

Another advantage of the reports contemplated by the present invention over normal billings is that fraudulent charges by third parties can be detected from the reports generated—employees can more easily identify non-business related calls.

In a specific aspect of the invention a method and means are provide to match long distance telephone billing records with telephone directory records, using the telephone number called as the matching criterion, to produce augmented long distance telephone bills showing selected directory data for each call. Billing records not matched with directory records are flagged, possibly for optional searches in external data sets, or if the directory records consist of unauthorized numbers, flagged for reporting as a call to an unauthorized telephone number.

According to another feature of the invention, methods and apparatus to add data to long distance telephone billings by recognizing (reading) and processing selected data from selected data fields within a complexity of data in a number of fields, e.g. billing information received in several different forms and formats. For example, in some cases billing information is received on computer-readable magnetic disks or tapes, while in other cases the billing information is on paper. Specifically, the invention comprises methods and means to write input data provided by the user on paper into the computer using optical scanning, optical character recognition, and analyzing methods and means to capture, convert to computer manipulatable data, and isolate relevant data. A particularly important feature in this regard is the ability to easily revise the process used by the analyzing means to cope with the variety of billing formats used by long distance telephone service providers.

According to a further feature of the invention, methods and means are provided for automatic connection to and searching of external directory information databases in situations in which directory data stored in the invention are not comprehensive or current enough to find or rely on for matching some telephone numbers.

According to a further feature of the invention, methods and means are provided to retain the output set of records (used to produce useful displays, reports, communications, or augmented reprintings of the input long distance billing) and to generate a secondary directory data set (containing the directory data found for the current billing data set) so as to facilitate an initially more rapid matching of called numbers with directory information in the processing of subsequent billing data sets, particularly where searching of external directory information databases is required.

To carry out the process described generally above, the invention uses conventional techniques and apparatus to store (1) directory information obtained in whatever manner is most feasible, including, by way of example, magnetic media, remote database connections, or CD ROM media from vendors of such information or from telephone books using optical character readers or manual entry and (2) billing information for a particular telephone or system of telephones using whatever means are most convenient, including manual entry, optical character readers, magnetic media, and telecommunication with the billing entity.

DETAILED DESCRIPTION OF THE INVENTION

The following discussion will, for brevity, when applied to telephone calls data and directory data deal with only the addition of name information and the presence or absence of telephone numbers in a directory, but other information found in telephone directories (address, for example) and elsewhere may also be added to telephone bill data, using variants of the same method and apparatus.

In its most general embodiment, apparatus according to the present invention reads input data from at least two sources (e.g. data sources A, B in FIG. 2), each source providing data organized in a known manner or in a manner ascertainable from the data itself. Data from each input source are read (steps 10, 12 of FIG. 1) converted if necessary (steps 14 and 16 in FIG. 1) by one or more converters such as optional converter 54 shown in FIG. 2, to machine manipulatable form, and then examined by data selectors 56, 58 to identify and select (steps 18 and 20) data of interest. Selected data from each input source are stored (steps 22 and 24) in mass storage (storers 60, 62) in records having fields for each portion of the information selected that may need to be separately manipulated or compared. The records from each input set are stored by means of storers 60, 62 performing steps 22, 24 in separate sets of internal records. Note that conversion steps 14, 16, if required, could be, depending upon the character of the raw data, be effected in somewhat different sequence. For example, conversion step 14 could follow selection step 18 in appropriate circumstances. Note also that it may be necessary for a human to check the converted data if the conversion step is subject to error.

Each set of internal records is then sorted (steps 26 and 28 in FIG. 1) by sorters 64, 66 on a common key (i.e., a field containing data having a common meaning for all records). For example, if each record in all sets of internal records has a field that contains a number that has a common meaning for all records (e.g. a telephone number), then sorting each set of internal records using that field as a key will produce sets of internal records ordered according to the same scheme.

Figure 1:
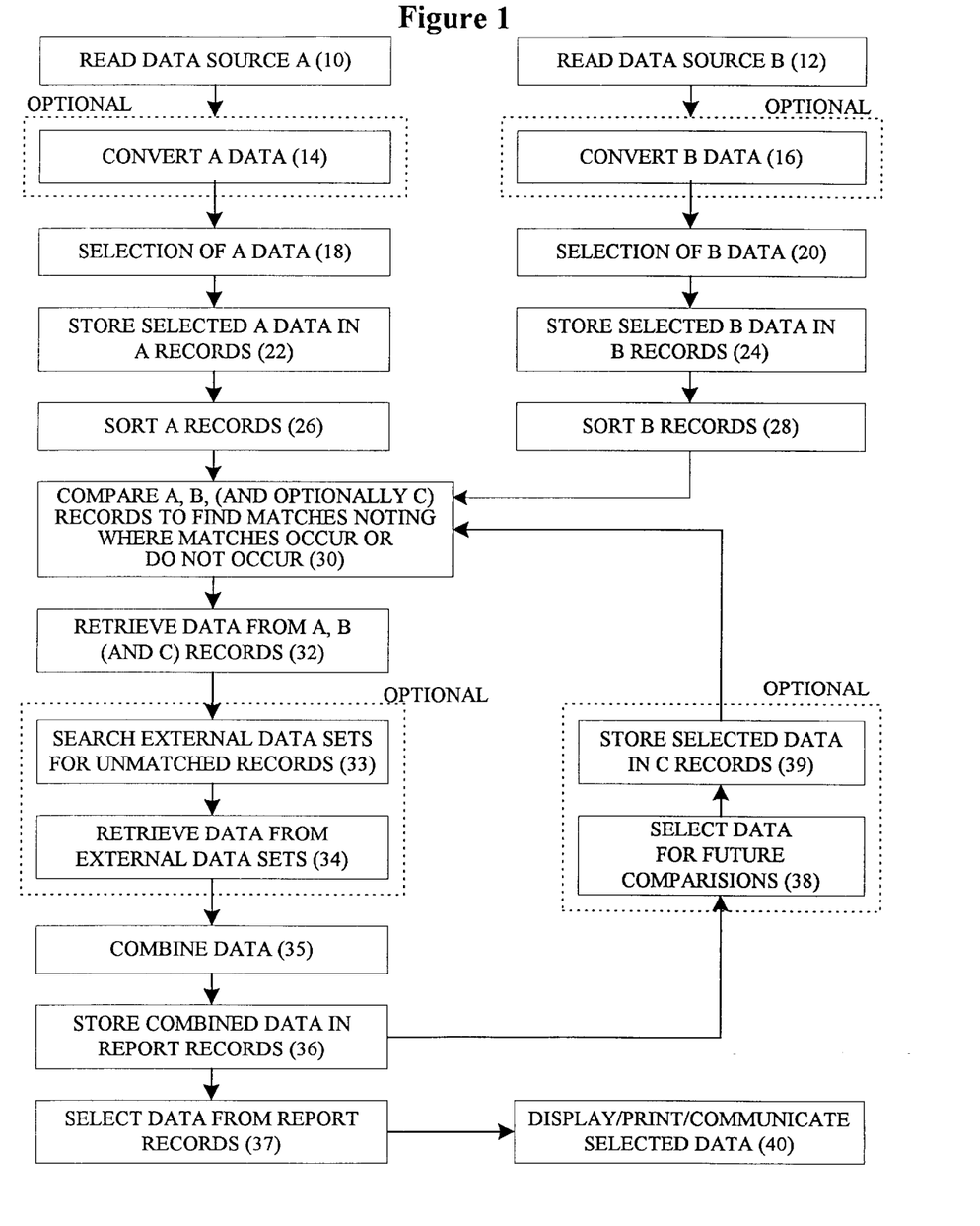
FIG. 1 is a flow chart depicting the processing of data according to a general embodiment of the method of the invention.

After sorting has been completed, the ordered sets of internal records are compared (step 30) by comparator 68, using the same criteria as used for the sorting operation. Continuing the example above, records match if the contents of selected fields used for sorting are the same in each record. Whenever matching records are located, data from selected data fields in the matching records are retrieved (step 32) by retriever 70. Optionally, external data sets are searched for unmatched records and, if matches are found, the associated data are retrieved, and combined (step 35) by data combiner 72 to produce a series of report records, each of which is stored (step 36) in suitable storage means 73 that stores the report records thus generated. After processing (comparison) of the input records is complete, the data in the report records are selected (step 37) by selector 74, and displayed or printed (step 40) by a suitable display monitor, printer or the like (component 82 in FIG. 2).

For example, a specific embodiment of the invention produces a version of one input source of data set of records augmented by information from more comprehensive sources of data. The report records may optionally be stripped of any extraneous data (step 38) and stored (step 39) in a secondary set of data records to speed up processing in the future. Because the matching process 30 compares sorted records in sequence, the report records will necessarily be in sorted order. Therefore no sorting of the secondary set of data records is needed if directory data is selected from the report records in the order in which the report records are created. An example of the general flow of data according to the invention for two sets of data records is shown in FIG. 1. Also optionally, the invention may be configured to perform external database searches when no match is found. In the specific embodiment, this would occur if the more comprehensive database lacked data in some cases.

In general, the apparatus and method of the invention can be used with sources of input data that may contain some common data, with the objective of combining the data from those sources to produce a product containing combined data. For example, one source of input data might be entries in a telephone directory while another source of input data might be long distance billings, with an entry for each long distance call. Each source of input data may, for example, contain one or more entries containing the same telephone number—the billing may be for one or more calls made to a telephone whose number is listed in a directory. The apparatus and method of the invention can then be used to extract information from the entry in the directory data that has the same telephone number as the entry from the set of billing data and store that information in a new rerecord. record. The set of all such report data records can then be processed to produce a useful product, viz an augmented long distance billing report.

Figure 2:
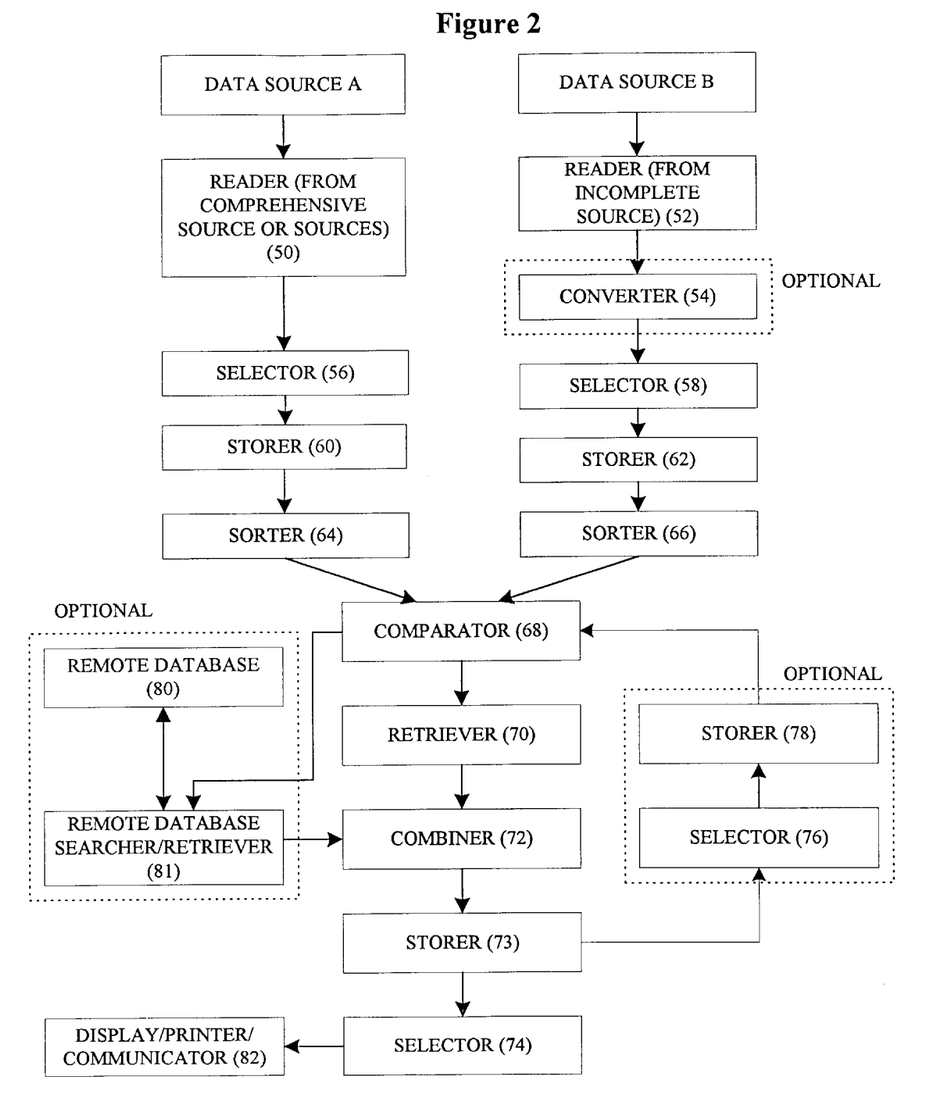
FIG. 2 is a block diagram depicting the configuration and interconnection of the combination functional units of a general embodiment of apparatus according to the invention.
Figure 3:
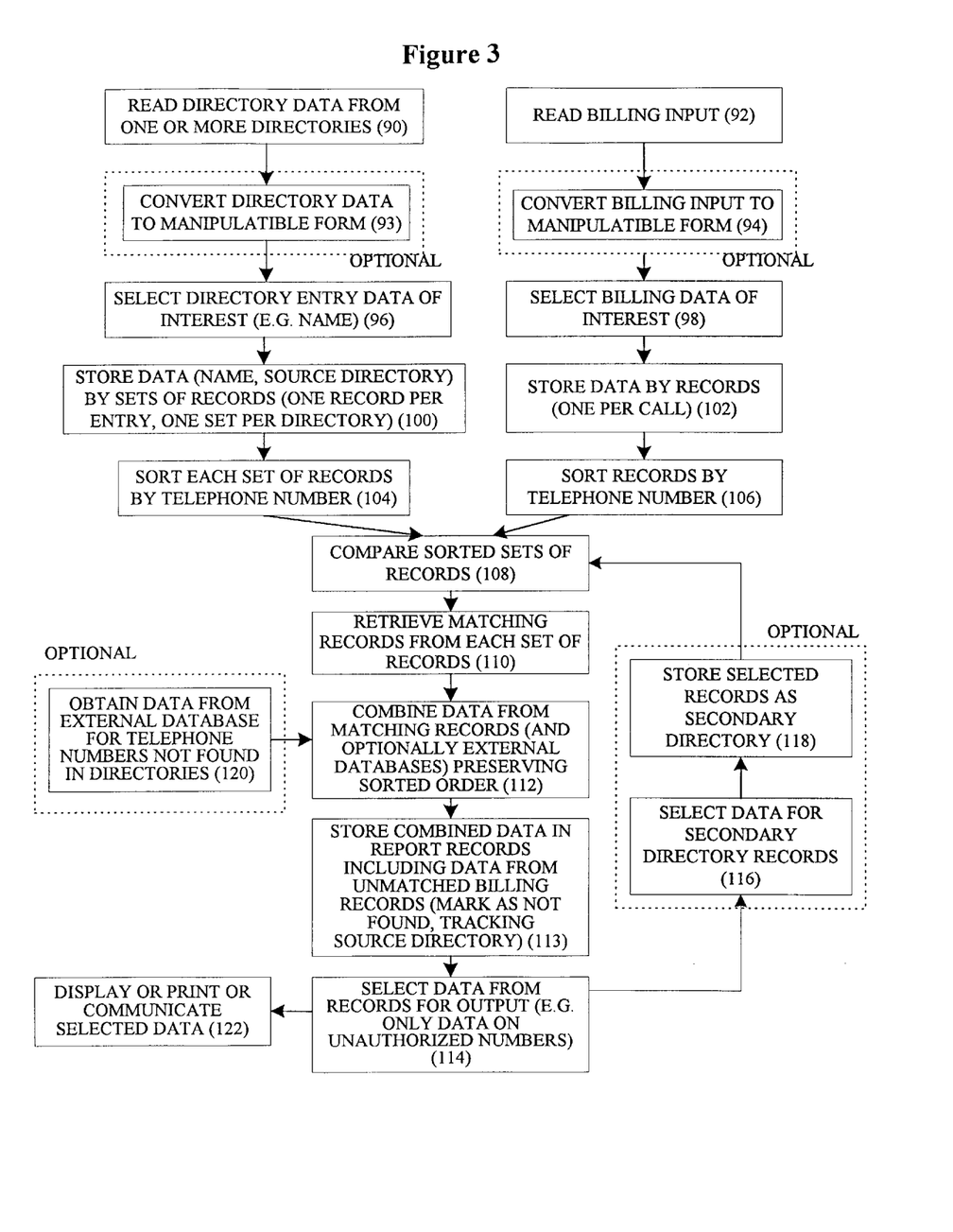
FIG. 3 is a flow chart depicting the processing of telephone directory and telephone billing data according to a specific embodiment of the method of the invention.
Figure 4:
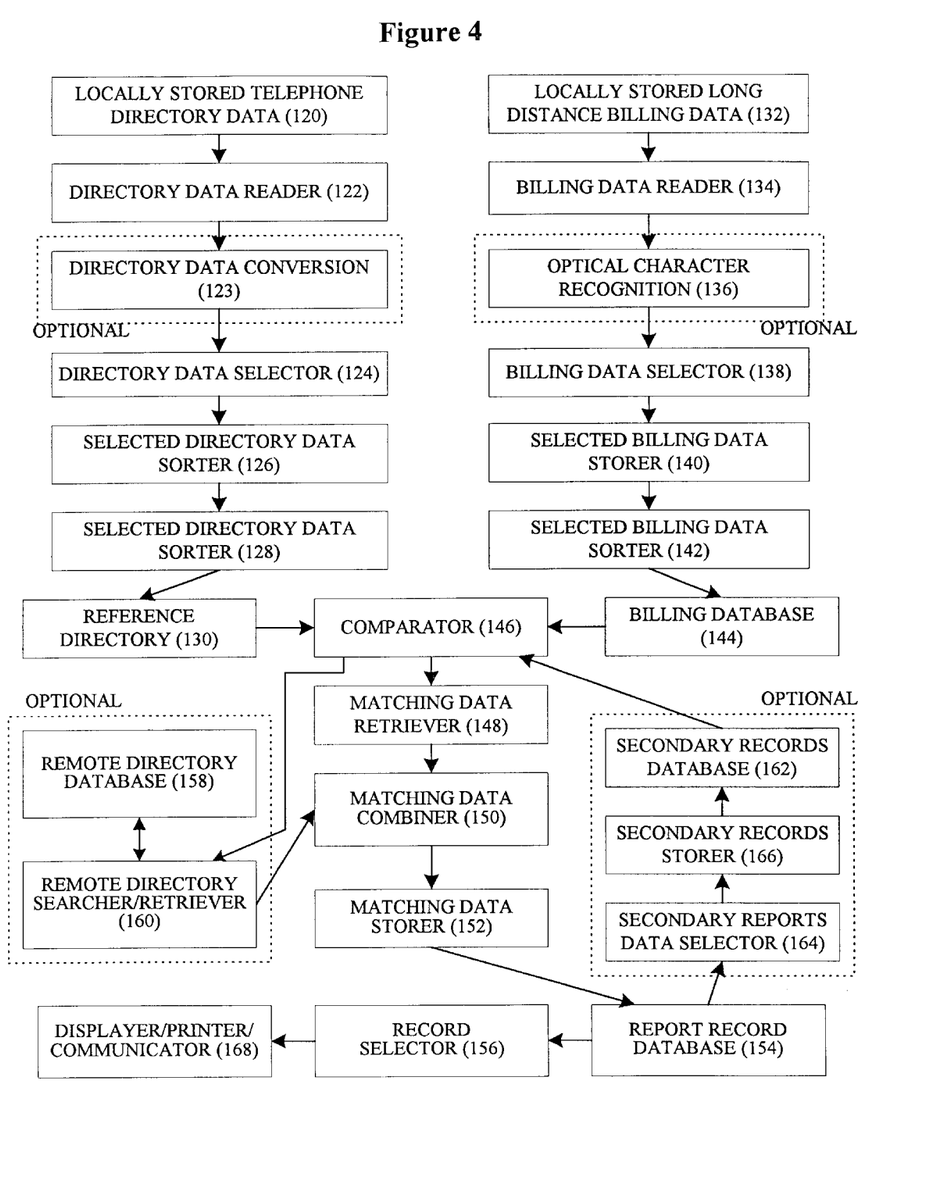
FIG. 4 is a block diagram of apparatus according to a specific embodiment of the invention suitable for implementing the method of FIG. 3.

The present invention can be applied to data sets consisting of telephone directories and telephone long distance billings using apparatus shown schematically in FIG. 4, which represents a specific embodiment of the apparatus of FIG. 2, following the method illustrated in the flowchart of FIG. 3, which is a specific embodiment of the flowchart of FIG. 1.

Referring to FIGS. 3,4, comprehensive lists of stored telephone directory data are read (step 90) by a directory data reader 122 and selected (step 96) by directory data selector 124 to extract and select data associated with each telephone number, data for which is to be found in data store 120. Again, an optional conversion step 93 may be effected in appropriate cases; the remarks above concerning conversion step 14 in FIG. 1 apply. If a conversion step 93 is utilized, then a suitable conversion device 123 should be employed. The selected data are stored (step 100) by selected directory data storer 126 in pre-selected locations in mass storage. Optionally, additional user-supplied directory data (e.g., the user's other office telephone numbers, user's customer's telephone numbers, and user's suppliers telephone numbers) may also be included in the directory data source 120 and read (step 90) by the reading means 122 concurrently with the comprehensive directory data. ("Telephone number" here means, as the context requires, either the number dialled by a caller within an area code, or that number together with the area code and possibly also the country code needed for complete identification of that number for calls made outside the area. Each telephone number (in the wider sense, consisting of the country code, area code, and local telephone number) with its associated data extracted from telephone directory data is contained in what is referred to here as a directory record. Each item of data in a directory record is referred to here as occupying a particular location in mass storage referred to as a field. For example, a particular directory record found in a particular location in mass storage has a field for name of the telephone service subscriber, in which is found the subscriber's name for that record.)

When all telephone directory data in data store 120 have been scanned and required data extracted and stored by storage device 126 in mass storage, the directory records (one for each telephone number in the wider sense) are, in the present embodiment, sorted (step 104) by the selected directory data sorter 128, first by country code, then within those directory records having the same country code, by area code, and finally within those directory records having the same country code and area code, by local telephone number. The resulting stored collection of sorted data is referred to here as the reference directory 130. The reference directory is a resource compilation of selected data associated with each telephone number (e.g. name of subscriber, address of subscriber, etc.) against which selected billing information may be compared.

All data relating to a specific long distance telephone call are referred to here as a billing record. Each item of data in a billing record is referred to here as occupying a field. For example, a particular billing record found in a particular location in billing data store 132 would have a field for the area code, in which would be found as data the area code for that record. (If the stored data have not been established in such database format, it may be necessary to create such suitable database as a separate processing step.) Each billing record contains fields for at least the country code, the area code, and the telephone number of the number called. In addition, fields for each item of data necessary to uniquely identify the call (e.g. date, time, length of call, and the call charge) are contained in each record, so as to include everything necessary to reconstruct the input billing information augmented by data obtained from the master directory.

Long distance billing data 132 are read (step 92) by billing data reader 134 and data of predetermined types or within predetermined fields are selected (step 98) by billing data selector means 138 to extract selected data associated with each long distance call for which billing data exist. The selected data are then stored (step 102) by selected billing data storer 140 in pre-selected locations in mass storage.

For billing data provided on paper, the billing data reader 134 will typically be a scanner. Optional optical character recognition means 136 are employed in such case to convert (step 94) the scanned data to computer manipulatable data. Many if not all optical character recognition devices are subject to error; there may be a need for someone to check the accuracy of the conversion.

When all billing data have been scanned and required selected data extracted and stored, the residual billing records (one for each long distance telephone call) are sorted (step 106), selected by the billing data sorter 142, first by country code, then within those records having the same country code, by area code, and finally within those records having the same country code and area code, by local telephone number. The resulting stored data is referred to here as the billing database 144.

The end result of the above process of FIG. 3 so far described is the creation of two sets of records, one set in reference directory 130 and the other set in billing database 144, each record containing a telephone number and the set of records in the respective databases 130, 144 having been sorted using the telephone number field(s) as a key. To complete the processing of the billing information, records from each set are compared (step 108) by the comparator 146 and, where a telephone number match is found, corresponding selected data from each database 130, 144 are retrieved (step 110) by the matching data retriever 148, combined (step 112) by the matching data combiner 150 and stored (step 113) by the matching data storer 152 in a set of report records (the report record database 154).

One method of finding matches is set out in the following rules:

(a) Two records match if (1) the contents of the country code field in one record alpha-numerically equal the contents of the country code field in the other record, (2) the contents of area code field in one record alpha-numerically equal the contents of the area code field in the other record, and (3) the contents of the telephone number field in one record alpha-numerically equal the contents of the telephone number field in the other record.

(b) Record A is referred to here as larger than record B if (1) the contents of record A's country code field are alpha-numerically larger than the contents of record B's country code field, or if (2) the contents of the country code fields of records A and B are equal and the contents of record A's area code field are alpha-numerically larger than the contents of record B's area code field, or if (3) the contents of the country and area code fields are equal and the contents of record A's telephone number field are numerically larger than the contents of record B's telephone number field.

(c) If neither (a) nor (b) is true, then record A is referred to here as smaller than record B.

To supply directory and billing information to the report record database 154, the first record in the billing database 144 is compared with the records in the reference directory database 130 until either the records match or the record from the billing database 144 is smaller than the current record from the reference directory 130. If the records being compared match, then selected fields from the reference directory record and the billing record are copied into the corresponding fields of the record database record. Then the next billing record is compared to the last reference directory record (to deal with possibly matching billing records— calls to the same telephone number). If the record from the billing database 144 is smaller than the record from the current reference directory record, then the next billing database record is compared to the remaining reference is directory records starting with the last master directory record compared. This process continues until all billing database records have been compared.

The portions of the combined data stored (step 113) by the storer 152 in the report records database 154 needed to produce useful reports are next selected (step 114) by the record selector 156.

Optionally, the apparatus of FIG. 4 may include searching means 160 to search (step 120), with or without operator intervention, one or more external databases 158 for additional directory information not found in its internally stored reference directory 130. Another option is the creation of a secondary records database 162 from data in the report records database 154. Data would be selected (step 116) by the secondary reports data selector 164 from the report records stored in report records database 154, omitting specific call billing data and duplicates. The data thus selected are stored (step 118) by the secondary records storer 166 in the secondary records database 162. The processing of future sets of billing data records would then proceed as described above except that contents of the secondary database 162 would be compared (step 108) by the comparator 146 prior to attempting to match to the reference directory 130 and billing records database 144. Since the contents of the database 162 would typically be much smaller than the contents of databases 130 and 144, an appreciable saving of data comparison time could be achieved by the use of the secondary records database 162. In other words, in at least some configurations of the apparatus, it may be advantageous to try to match billing records with the secondary records database 162 obtained from previous processing before attempting to match such billing records against the data in the reference directory 130. For example, it may be possible to compare the secondary records in random access memory with the billing data records whereas the reference directory records may have to be maintained in slower-accessed mass storage (hard disk or magnetic tape). Preliminary comparison using the secondary records would thus be expected to result in increased processing speed in such configurations. Previously matched telephone number data residing in the secondary database 162 could be purged at every update of the source directory 120 for those numbers.

Those report records of interest to users are finally selected (step 114) by the selector 156 from those stored (step 113) by the storer 152 and displayed or printed (step 122) by a suitable report records displayer (e.g. cathode ray monitor), printer, or communicator 168. The data thus displayed, printed or communicated would be expected to be useful for establishing whether or not given telephone calls billed to the user of the system were authorized business calls or otherwise. It would also be valuable to professionals such as lawyers so that calls related to work done for a client or to a project would be properly attributed.

What is claimed is:

1. Telephone billing processing apparatus for use with telephone directory data and billing records data comprising:

(a) directory reading means to accept and read input telephone directory data;

(b) billing reading means to accept and read input billing records data;

(c) directory entry selecting means to extract name/number data representing each telephone number and associated name from the input telephone directory data read by the directory reading means;

(d) billing line selecting means to extract billing line data representing each telephone number called and preselected associated data from the input billing records data read by the billing reading means;

(e) directory entry storing means for writing name/number data selected by the directory entry selecting means into mass storage in fields in directory entry records, one record for each directory entry read;

(f) billing line storing means for writing the billing line data selected by the billing line selecting means into mass storage in fields in billing line records, one record for each billing line read;

(g) directory entry sorting means for sorting by telephone number directory entry records stored by the directory entry storing means;

(h) billing line sorting means for sorting by telephone number billing line records stored by the billing line storing means;

(i) comparison means for comparing stored directory entry records with stored billing line records to find records with matching telephone numbers;

(j) retrieving means for retrieving each stored billing line records and each matching stored directory entry record;

(k) combining means for combining selected data from each retrieved stored billing line record with selected data from all retrieved matching stored directory entry records into a report record having fields for each item of selected retrieved data;

(l) storing means for storing each report record;

(m) selecting means for extracting selected data from each stored report record; and (n) output means for presenting selected data from stored report records.

2. Telephone billing data processing apparatus as defined in claim 1, additionally comprising input billing records data conversion means for receiving and converting data from said billing reading means and providing an output to the billing line selecting means, wherein the input billing records data read by billing reading means are converted to machine manipulatable form before data are extracted from converted input billing records data by billing line selecting means.

3. Telephone billing data processing apparatus as defined in claim 2, wherein the billing records data conversion means comprises optical character recognition means.

4. Telephone billing data processing apparatus as defined in claim 1, wherein the comparison means provides unmatched billing line records, additionally comprising:

remote database searching means for searching at least one remote database for fresh matches in data for said unmatched billing line records; and remote database retrieving means for retrieving fresh matching data found in the remote database;

and wherein the combining means combines selected data from freshly matched records and retrieved matching remote data into report record.

5. Telephone billing data processing apparatus as defined in claim 1, wherein the directory entry records and billing line records are primary stored records, and additionally comprising:

secondary data selecting means for extracting selected data from stored report records; and     secondary data storing means for writing selected secondary data into mass storage in fields in secondary stored records, one record for each telephone number,     and wherein the comparison means compares the sets of primary stored records and the set of secondary stored records to find records from each said set of stored records that match using telephone numbers as the basis for matching.

6. Telephone billing data processing apparatus as defined in claim 1, wherein output means comprises displaying means.

7. Telephone billing data processing apparatus as defined in claim 6, wherein displaying means comprises a cathode ray tube and associated electronic circuit means.

8. Telephone billing data processing apparatus as defined in claim 1, wherein output means comprises printing means.

9. Telephone billing data processing apparatus as defined in claim 1, wherein output means comprises communicating means.

10. A method of processing telephone directory data and billing records data comprising the steps of:

(a) accepting and reading input telephone directory data;

(b) accepting and reading input billing records data;

(c) extracting name/number data representing each telephone number and associated name from the input telephone directory data;

(d) extracting billing line data representing each telephone number called and preselected associated data from the input billing records data;

(e) writing name/number data selected by the directory entry selecting means into mass storage in fields in directory entry records, one record for each directory entry read;

(f) writing the billing line data selected by the billing line selecting means into mass storage in fields in billing line records, one record for each billing line read;

(g) sorting directory entry records by telephone number;

(h) sorting billing line records by telephone number;

(i) comparing stored directory entry records with stored billing line records to find records with matching telephone numbers;

(j) retrieving each stored billing line records and each matching stored directory entry record;

(k) combining selected data from each retrieved stored billing line record with selected data from all retrieved matching stored directory entry records into a report record having fields for each item of selected retrieved data;

(l) storing each report record;

(m) extracting selected data from each stored report record; and     (n) presenting selected data from stored report records.

11. A method as defined in claim 10, additionally comprising receiving and converting data read in step (b) and providing an output to step (c), wherein the input billing records data are converted to machine manipulatable form before data are extracted in step (d).

12. A method as defined in claim 11, wherein the billing records data is converted by optical character recognition methods.

13. A method as defined in claim 10, wherein step (i) provides unmatched billing line records, additionally comprising:

searching at least one remote database for fresh matches in data for said unmatched billing line records; and     retrieving fresh matching data found in the remote database; and wherein step (k) combines selected data from freshly matched records and retrieved matching remote data into report record.

14. A method as defined in claim 10, wherein the directory entry records and billing line records are primary stored records, and additionally comprising:

extracting selected data from stored report records; and     writing selected secondary data into mass storage in fields in secondary stored records, one record for each telephone number,     and wherein step (i) compares the sets of primary stored records and the set of secondary stored records to find records from each said set of stored records that match using telephone numbers as the basis for matching.

15. A method as defined in claim 10, wherein step (n) comprises displaying selected data from stored report records.

16. A method as defined in claim 10, wherein step (n) comprises printing selected data from stored report records.

17. A method as defined in claim 10, wherein step (n) comprises communicating selected data from stored report records.

18. Data processing apparatus for use with at least two input data sources comprising:

(a) input data source reading means to accept and read input data from each input data source, where one said input data source contains public information;

(b) data selecting means to extract selected data from the input data read by the input data source reading means;

(c) selected data storing means for writing data extracted by the data selecting means into mass storage in data storage records, one set of data storage records for each input data source;

(d) data storage records sorting means for sorting each set of data storage records on a preselected common sorting criterion;

(e) comparison means for comparing the sets of sorted data storage records to find records from each set of sorted data storage records that match using the said preselected common sorting criterion as the basis for matching;

(f) retrieving means for retrieving the stored data storage records from each set of stored data storage records that matched in step (e);

(g) combining means for combining selected data from matching retrieved stored data storage records into a report record;

(h) storing means for storing each report record;

(i) selecting means for extracting selected data from each stored report record; and     (j) output means for presenting selected data extracted from stored report records, wherein the data storage records are primary stored records, and additionally comprising:

secondary data selecting means for extracting selected data from stored report records; and     secondary data storing means for storing selected secondary data in secondary stored records, and wherein the comparison means compares the sets of primary stored records and the set of secondary stored records to find records from each said set of stored records that match using the said preselected common sorting criterion as the basis for matching.

19. A method for processing data from at least two input data sources comprising the steps of:

(a) selecting an input data source which contains public information and selecting another input data source;

(b) accepting and reading input data from each input data source;

(c) extracting selected data from the input data;

(d) writing data extracted by the data selecting means into mass storage in data storage records, one set of data storage records for each input data source;

(e) sorting each set of data storage records on a preselected common sorting criterion;

(f) comparing the sets of sorted data storage records to find records from each set of sorted data storage records that match using the said preselected common sorting criterion as the basis for matching;

(g) retrieving the stored data storage records from each set of stored data storage records that matched in step (f);

(h) combining selected data from matching retrieved stored data storage records into a report record;

(i) storing each report record;

(j) extracting selected data from each stored report record; and (k) presenting selected data extracted from stored report records, wherein the data storage records are primary stored records and additionally comprising extracting selected data from stored report records, and storing selected secondary data in secondary stored records, and wherein step (f) compares the sets of primary stored records and the set of secondary stored records to find records from each said set of stored records that match using the said preselected common sorting criterion as the basis for matching.

20. Data processing apparatus for use with at least two input data sources comprising:

(a) input data source reading means to accept and read input data from each input data source, where one said input data source contains public information;

(b) data selecting means to extract selected data from the input data read by the input data source reading means;

(c) selected data storing means for writing data extracted by the data selecting means into mass storage in data storage records, one set of data storage records for each input data source;

(d) data storage records sorting means for sorting each set of data storage records on a preselected common sorting criterion;

(e) comparison means for comparing the sets of sorted data storage records to find records from each set of sorted data storage records that match using the said preselected common sorting criterion as the basis for matching;

(f) retrieving means for retrieving the stored data storage records from each set of stored data storage records that matched in step (e);

(g) combining means for combining selected data from matching retrieved stored data storage records into a report record;

(h) storing means for storing each report record;

(i) selecting means for extracting selected data from each stored report record; and (j) output means for presenting selected data extracted from stored report records.

21. Data processing apparatus as defined in claim 20, additionally comprising input data conversion means for receiving and converting data from a selected one of said input data source reading means and providing an output to the data selecting means, wherein the input data read by the input data source reading means are converted to machine manipulatable form before such data are selected by data selecting means.

22. Data processing apparatus as defined in claim 21, wherein the input data conversion means comprises optical character recognition means.

23. Data processing apparatus as defined in claim 20, wherein the comparison means provides unmatched data records for selected data from one of the data sources unmatched with data from the other of the sources, and additionally comprising:

remote database searching means for searching at least one remote database for fresh matches in data for said unmatched data records; and remote database retrieving means for retrieving fresh matching data found in the remote database, and wherein the combining means combines selected data from freshly matched records and matching retrieved remote data into report record.

24. Data processing apparatus as defined in claim 20, wherein output means comprises displaying means.

25. Data processing apparatus as defined in claim 24, wherein output means comprises a cathode ray tube and associated means.

26. Data processing apparatus as defined in claim 20, wherein output means comprises printing means.

27. Data processing apparatus as defined in claim 20, wherein output means comprises communicating means.

28. A method for processing data from a least two input data sources comprising the steps of:

(a) selecting an input data source which contains public information and selecting another input data source;

(b) accepting and reading input data from each input data source (c) extracting selected data from the input data;

(d) writing data extracted by the data selecting means into mass storage in data storage records, one set of data storage records for each input data source;

(e) sorting each set of data storage records on preselected common sorting criterion;

(f) comparing the sets of sorted data storage records to find records from each set of sorted data storage records that match using the said preselected common sorting criterion as the basis for matching;

(g) retrieving the stored data storage records from each set of stored data storage records that matched in step (e);

combining selected data from matching retrieved stored data storage records into a report record;

(i) storing each report record;

(j) extracting selected data from each stored report record; and (k) presenting selected data extracted from stored report records.

29. A method as defined in claim 28, additionally comprising receiving and converting data from a selected one of said input data sources, wherein the input data read are converted to machine manipulatable form before such data are extracted in step (c).

30. A method as defined in claim 29, wherein the input data is converted by optical character recognition methods.

31. A method as defined in claim 28, wherein step (f) provides unmatched data records for selected data from one of the data sources unmatched with data from the other of the sources, and additionally comprising: searching at least one remote database for fresh matches in data for said unmatched data records; and retrieving fresh matching data found in the remote database, and wherein step (q) combines selected data from freshly matched records and matching retrieved remote data into report record.

32. A method as defined in claim 28, wherein step (k) comprises displaying selected data extracted from stored report records.

33. A method as defined in claim 28, wherein step (k) comprises printing selected data extracted from stored report records.

34. A method as defined in claim 28, wherein step (k) comprises communicating selected data extracted from stored report records.

\* \* \* \* \*